United States Patent
Ambroise et al.

(10) Patent No.: US 10,697,420 B2
(45) Date of Patent: Jun. 30, 2020

(54) IGNITION SYSTEM OF AN AIRCRAFT TURBINE ENGINE

(71) Applicant: Airbus Operations SAS, Toulouse (FR)

(72) Inventors: Richard Ambroise, Merville (FR); Xavier Collas, Bellegarde Sainte Marie (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 71 days.

(21) Appl. No.: 16/161,941

(22) Filed: Oct. 16, 2018

(65) Prior Publication Data

US 2019/0120199 A1    Apr. 25, 2019

(30) Foreign Application Priority Data

Oct. 23, 2017 (FR) ..................... 17 59950

(51) Int. Cl.
    *F02P 17/12*    (2006.01)
    *F02C 7/266*    (2006.01)
    (Continued)

(52) U.S. Cl.
    CPC .............. *F02P 17/12* (2013.01); *F02C 7/266* (2013.01); *F02P 15/003* (2013.01); *F23Q 23/10* (2013.01);
    (Continued)

(58) Field of Classification Search
    CPC ........ F02P 15/00; F02P 15/001; F02P 15/003; F02P 15/005; F02P 17/12; F02C 7/26;
    (Continued)

(56) References Cited

U.S. PATENT DOCUMENTS

| 4,377,785 A * | 3/1983 | Ueno .................... F02P 3/0442 |
| | | 324/378 |
| 4,760,341 A | 7/1988 | Skerritt |
| | (Continued) | |

FOREIGN PATENT DOCUMENTS

| EP | 0226302 A2 | 6/1987 |
| EP | 0501152 A2 | 9/1992 |
| FR | 2717534 A1 | 9/1995 |

OTHER PUBLICATIONS

French Search Report; priority document.

*Primary Examiner* — Huy Q Phan
*Assistant Examiner* — David B Frederiksen
(74) *Attorney, Agent, or Firm* — Greer, Burns & Crain, Ltd.

(57) ABSTRACT

A turbine engine ignition system comprising a spark plug having excitation and return terminals, and a spark plug exciter connected to the excitation terminal. The return terminal is connected to an equipotential reference-forming structure, the exciter device is connected to a command line for a signal to supply an excitation signal to the spark plug. The ignition system comprises a control device comprising current and voltage sensors, a first voltage comparator, a second current comparator, and a microcontroller receiving output from the two comparators. The first comparator compares the voltage sensor signal to a first reference value and the second comparator compares the current sensor signal to a second reference value. The microcontroller generates a signal indicating a malfunction of the ignition system if the current sensor signal is lower than the second reference value while the voltage sensor signal is higher than the first reference value.

6 Claims, 5 Drawing Sheets

(51) Int. Cl.
*F02P 15/00* (2006.01)
*F23Q 23/10* (2006.01)

(52) U.S. Cl.
CPC .... *F02P 2017/121* (2013.01); *F05D 2260/80* (2013.01); *F05D 2260/83* (2013.01); *F05D 2260/85* (2013.01); *F05D 2260/99* (2013.01); *F05D 2270/80* (2013.01)

(58) Field of Classification Search
CPC .......... F02C 7/264; F02C 7/266; F23Q 23/00; F23Q 23/08; F23Q 23/10
See application file for complete search history.

(56) References Cited

U.S. PATENT DOCUMENTS

| | | | |
|---|---|---|---|
| 5,168,699 A | | 12/1992 | McCarty et al. |
| 5,343,154 A | * | 8/1994 | Frus ........................ F02C 7/266 |
| | | | 324/380 |
| 6,275,041 B1 | * | 8/2001 | Okamura ................ F02P 17/12 |
| | | | 324/380 |
| 9,920,736 B2 | * | 3/2018 | Tang .................... F02P 3/0442 |
| 2015/0322863 A1 | | 11/2015 | Burke et al. |

\* cited by examiner

ND SYSTEM OF AN AIRCRAFT
IGNITION SYSTEM OF AN AIRCRAFT TURBINE ENGINE

CROSS-REFERENCES TO RELATED APPLICATIONS

This application claims the benefit of the French patent application No. 1759950 filed on Oct. 23, 2017, the entire disclosures of which are incorporated herein by way of reference.

BACKGROUND OF THE INVENTION

The present invention relates to an ignition system of an aircraft turbine engine.

An ignition system of a turbine engine comprises an ignition spark plug arranged in a combustion chamber of the turbine engine and a spark plug exciter device which comprises, in particular, an electronic energy accumulation device and a control circuit in order to release the accumulated energy to the spark plug.

The spark plug exciter device is linked to the control unit of the turbine engine (of FADEC: Full Authority Digital Engine Control, or turbine engine control and regulation computer type) which ensures the operation of the turbine engine, and, in particular, the management of the excitation of the spark plug. In the principle of operation, the control unit of the turbine engine is configured to supply an activation signal to the control circuit of the exciter device, thus provoking releasing of the accumulated energy to the spark plug.

The ground maintenance teams check the operation of the ignition system of an aircraft turbine engine by proceeding, in regularly scheduled inspections, with electrical tests of the components of the system. Such operations take a long time to implement because they require manipulations in order to have access to the different components of the ignition system.

SUMMARY OF THE INVENTION

One of the objectives of the present invention is to facilitate the detection of failure of the ignition system.

The invention aims to address this need and relates to an ignition system of a turbine engine, the system comprising an ignition spark plug having a so-called excitation terminal and a so-called return terminal, a spark plug exciter device connected to the excitation terminal of the spark plug, the return terminal being, in use, connected to an equipotential reference-forming structure of the turbine engine, the exciter device being, in use, connected to a command line and to an electrical power source supplying an excitation signal to the spark plug on reception of an excitation signal over the command line,
the ignition system comprising a control device comprising a current sensor, a voltage sensor, a first comparator receiving as input a signal generated by the voltage sensor, a second comparator receiving as input a signal generated by the current sensor, and a microcontroller receiving the output of the two comparators, the first comparator being configured to compare the value of the amplitude of the signal generated by the voltage sensor to a first reference value and the second comparator being configured to compare the value of the signal generated by the current sensor to a second reference value, the microcontroller implementing an AND logic gate whose output is a signal indicative of a malfunction of the ignition system if the value of the amplitude of the signal generated by the current sensor is lower than the second reference value while the value of the amplitude of the signal generated by the voltage sensor is higher than the first reference value.

The incorporation of such a control device in an ignition system makes it possible to obtain a state of health thereof more easily.

The invention relates also to a method for detecting a malfunction of the ignition system of a turbine engine implemented by a control device, the ignition system comprising an ignition spark plug having a so-called excitation terminal and a so-called return terminal, a spark plug exciter device connected to the excitation terminal of the spark plug, the return terminal being, in use, connected to an equipotential reference-forming structure of the turbine engine, the exciter device being, in use, connected to a command line and to an electrical power source supplying an excitation signal to the spark plug on reception of an excitation signal over the command line,
the control device comprising a current sensor, a voltage sensor, a first comparator connected to the voltage sensor, a second comparator connected to the current sensor, and a microcontroller receiving the output of the two comparators,
the method comprising the following steps of:
measurement of a voltage by the voltage sensor, the sensor generating a signal that is the image of the voltage;
measurement of a current by the current sensor, the sensor generating a signal that is the image of the current;
comparison, by the first comparator, of the amplitude of the signal generated by the voltage sensor with a first reference value;
comparison, by the second comparator, of the amplitude of the signal generated by the current sensor with a second reference value;
monitoring, by the microcontroller, of the state of the output signal of the first comparator and of the state of the output signal of the second comparator;
generation, by the microcontroller, of a signal indicative of a malfunction of the ignition system if the value of the amplitude of the signal generated by the current sensor is lower than the second reference value while the value of the amplitude of the signal generated by the voltage sensor is higher than the first reference value.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
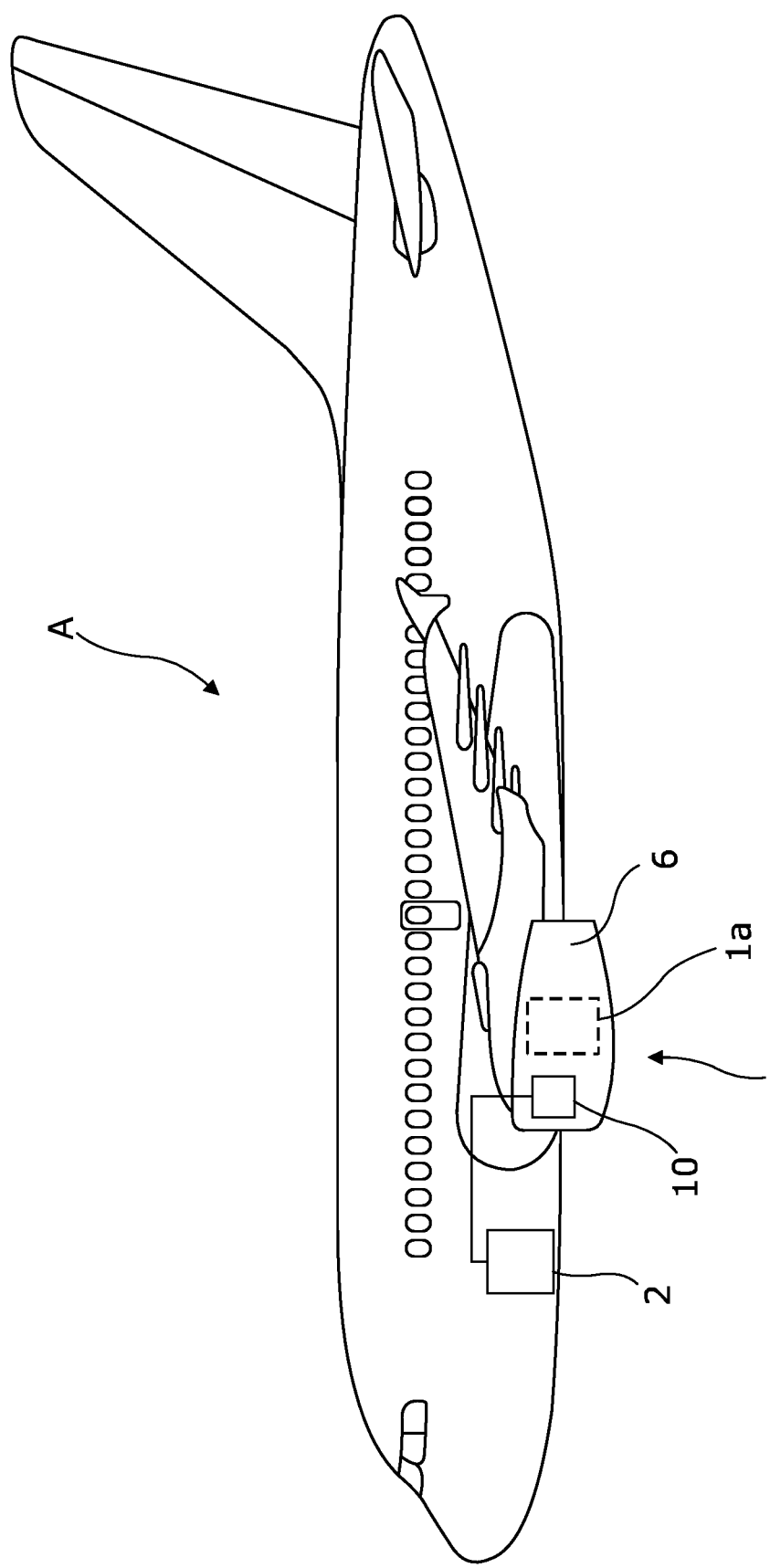
FIG. 1 represents an aircraft comprising a turbine engine with which is associated an ignition system according to an embodiment of the invention.
Figure 2:
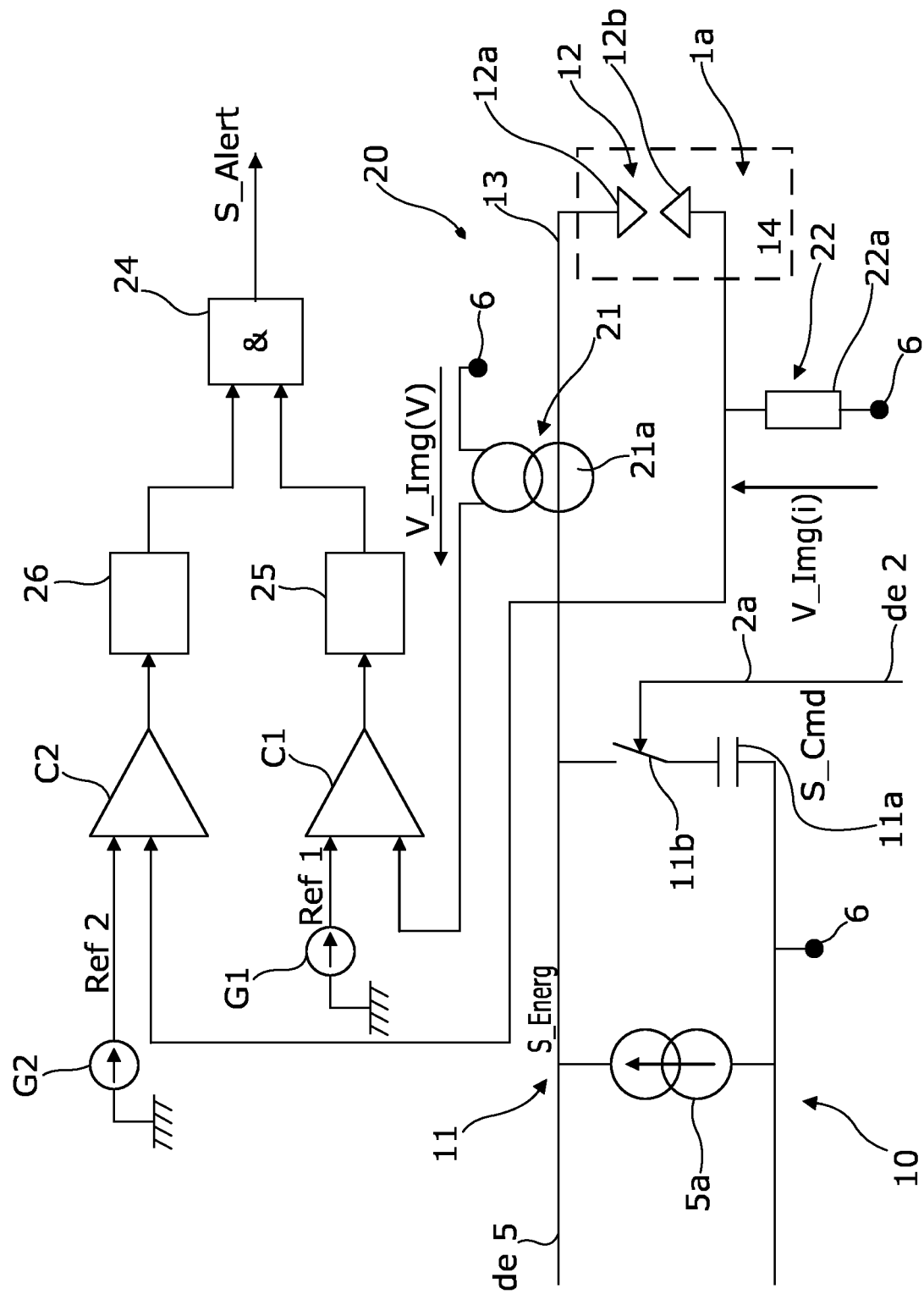
FIG. 2 represents an electrical circuit diagram of the ignition system according to an embodiment of the invention, the ignition system comprising a device for monitoring the operation of the system.

In relation to FIGS. 1 and 2, an aircraft A comprises a turbine engine 1 and a control unit 2 of the turbine engine (of FADEC type) for checking and monitoring the operation of the turbine engine 1 and which can be arranged in the turbine engine or, as an alternative, in the aircraft. The turbine engine 1 is associated with at least one ignition system 10 (generally two) connected to the control unit 2 ensuring the ignition of the air-fuel mixture present in the combustion chamber 20 of the turbine engine.

Each ignition system 10 comprises an exciter device 11 connected to an electrical power source 5 of the aircraft and to a structure of the turbine engine 6 (for example a metal frame) forming an equipotential reference, and an ignition spark plug 12 arranged in the combustion chamber 20 of the turbine engine.

The ignition spark plug 12 comprises a so-called excitation terminal 12a and a so-called return terminal 12b. The excitation terminal 12a is linked to the exciter device 11 via an electrical link 13, and the return terminal 12b is connected to the structure of the turbine engine 6 via an electrical link 14.

In an exemplary embodiment in which the exciter device 11 is of capacitive technology, the electrical power source 5 of the aircraft is a voltage source (alternating or direct) and the exciter device 11 comprises:

a circuit 5a (produced via transistors) for transforming the voltage source 5 into alternating current source (the circuit 5a is schematically represented by a current source in the figures)

a switching device 11b (for example of switch type with i/V characteristic or of solid state switch type)

an accumulating capacitor 11a of which one terminal is connected to the circuit 5a and to the excitation terminal 12a of the spark plug 12 and another terminal is connected to the structure of the turbine engine 6 via the switching device 11b.

The switching device 11b is connected to the control unit 2 by means of a command line 2a, via which, by the sending of an activation signal S_Cmd, the control unit 2 can trigger the switching device 11b (triggering=opening of the switching device) in order for the accumulating capacitor 11a to discharge into the spark plug 12 and for the latter to produce sparks in response to the discharging of the capacitor 11a.

As is known, the exciter device 11 of an ignition system 10 of a turbine engine is dimensioned to generate, in nominal operation, voltages of the order of 4000 to 6000 volts for maximum currents of the order of 1200 amperes.

According to the invention, the ignition system 10 also comprises an ignition system 10 control device 20 whose function is to check, when an excitation voltage is supplied by the exciter device 11, the correct operation of the ignition system 10.

In relation to FIG. 2, in which the control device 20 is of the analogue-digital type, the device comprises a voltage sensor 21, a current sensor 22, an analogue comparator C1 (for example an operational amplifier) receiving a signal V_Img(V) from the voltage sensor 21, an analogue comparator C2 (for example an operational amplifier) receiving a signal V_Img(i) from the current sensor 22, a microcontroller 24 and analogue-digital converters 25, 26 where each converter is connected to the output of a comparator C1, C2, between the latter and the microcontroller 24. The sensors 21, 22 are dimensioned to supply an output voltage that is acceptable for the analogue-digital converters 25, 26 (typically of the order of 0 to 5.5 V, even 3.3 V) and the comparators C1, C2.

The voltage/current sensors 21, 22 that the control device comprises are of technologies suitable for withstanding voltages and currents supplied by the exciter device 11, and for withstanding strong temperature variations (strong variation of the temperature during a flight due to altitude variations). As an example, as is represented in FIG. 2, the current sensor 22 is a shunt 22a arranged between the spark plug 12 and the structure of the turbine engine 6, whereas the voltage sensor 21 is for example a voltage transformer 21a of inductive type arranged between the exciter device 11 and the spark plug 12. Other types of sensors could be suitable, for example a resistive divider for the voltage sensor or a Hall effect sensor for the current sensor.

The current sensor, like the voltage sensor, generates a voltage whose amplitude is, respectively, the image of the value of the current V_img(i) in the downlink 14 and the image of the voltage V_img(V) in the uplink 13.

The first comparator C1 receives, as inputs, the signal V_img(V) generated by the voltage sensor 21 and a signal supplied by a direct voltage generator G1 and whose amplitude forms a first reference value Ref1. The first comparator C1 is configured to emit a non-nil voltage signal if the amplitude of the signal V_img(V) is higher than the first reference value Ref1, or of nil voltage otherwise. The analogue-digital converter 25 receives the output signal of the first comparator C1 and converts it into a digital signal.

The second comparator C2 receives, as inputs, the signal V_img(i) generated by the current sensor 22 and a signal supplied by a direct voltage generator G2 and whose amplitude forms a second reference value Ref2. The second comparator C2 is configured to emit a non-nil voltage signal if the amplitude of the signal V_img(i) is lower than the second reference value Ref2, or of nil voltage otherwise. The analogue-digital converter 26 receives the output signal of the second comparator C2 and converts it into a digital signal.

The microcontroller 24 receives the output signals of the two comparators, converted into digital signals by the analogue-digital converters 25, 26 in this particular case where the comparators are analogue. The microcontroller 24 is of central processing unit type comprising a processor and memories in which are stored instructions/logics (for example logic gate programming) which must be implemented by the processor during the operation of the microcontroller 24.

The microcontroller 24 implements, for example, an AND logic gate 34 receiving as inputs the output signals of the comparators C1, C2, converted into digital signals by the analogue-digital converters 25, 26. The AND logic gate generates a Boolean signal S_Alert which forms the output signal of the microcontroller. The signal S_Alert is an indicator signal:

indicative of a correct operation (signal S_Alert set at 0) of the ignition system 10 if the value of the amplitude of the signal V_img(i) generated by the current sensor 22 is higher than the second reference value Ref2 when the value of the amplitude of the signal V_img(V) generated by the voltage sensor 21 is higher than the first reference value Ref2;

indicative of a malfunction (signal S_Alert set at 1) of the ignition system 10 if the value of the amplitude of the signal V_img(i) generated by the current sensor 22 is lower than the second reference value Ref2 when the value of the amplitude of the signal V_img(V) generated by the voltage sensor 21 is higher than the first reference value Ref1.

The signal S_Alert emitted by the microcontroller 24 is, for example, sent to the control unit 2 for processing and displaying a status of the ignition system 10 on a dedicated display (not represented) to alert the ground maintenance teams.

Figure 3:
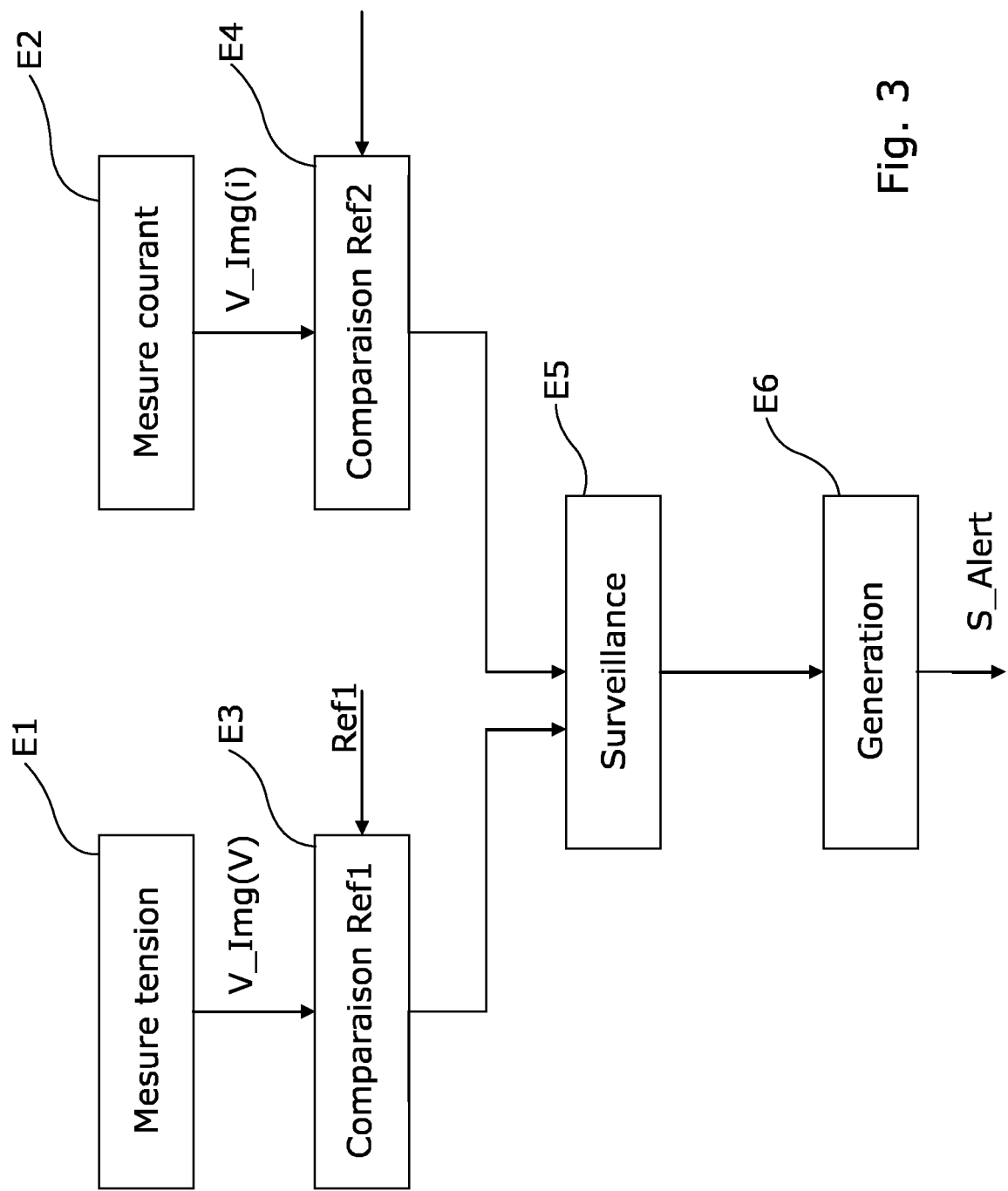
FIG. 3 is a diagram representing the steps implemented by the control device to check the operation of an ignition system according to the invention.

Referring to FIG. 3, the method for detecting a malfunction of the ignition system 10 implemented by the control device 20 therefore comprises the following steps of:

E1: measurement of a voltage by the voltage sensor 21, the sensor generating a signal V_img(V) that is the image of the voltage;

E2: measurement of a current by the current sensor 22, the sensor generating a signal V_img(i) that is the image of the current;

E3: comparison, by the first comparator C1, of the amplitude of the signal V_img(V) with the first reference value Ref1;

E4: comparison, by the second comparator C2, of the amplitude of the signal V_img(i) with the second reference value Ref2;

E5: monitoring, by the microcontroller 24, of the state of the output signal of the first comparator C1 and of the state of the output signal of the second comparator C2;

E6: generation/emission of a signal S_Alert indicative of a malfunction of the ignition system 10 if the value of the amplitude of the signal V_img(i) generated by the current sensor 22 is lower than the second reference value Ref2 while the value of the amplitude of the image signal V_img(V) generated by the voltage sensor 21 is higher than the first reference value Ref1.

Returning to the numeric values given above, the control device 20 is, for example, configured to alert of a malfunction of the ignition system 10 if the current consumed by the spark plug is lower than 50 A for an excitation voltage supplied by the exciter device higher than 700 V. Thus, the first reference value Ref1 of the comparator is chosen so as to be representative of a voltage of approximately 700 volts and the second reference value Ref2 is chosen so as to be representative of a current of approximately 50 amperes.

Preferably, (not represented in the figures) the measurement assembly also comprises a conditioner circuit and a low-pass filter that are arranged between each sensor and the comparator associated with the sensor in order to convert the signal generated by the sensor into a useable form.

Figure 4:
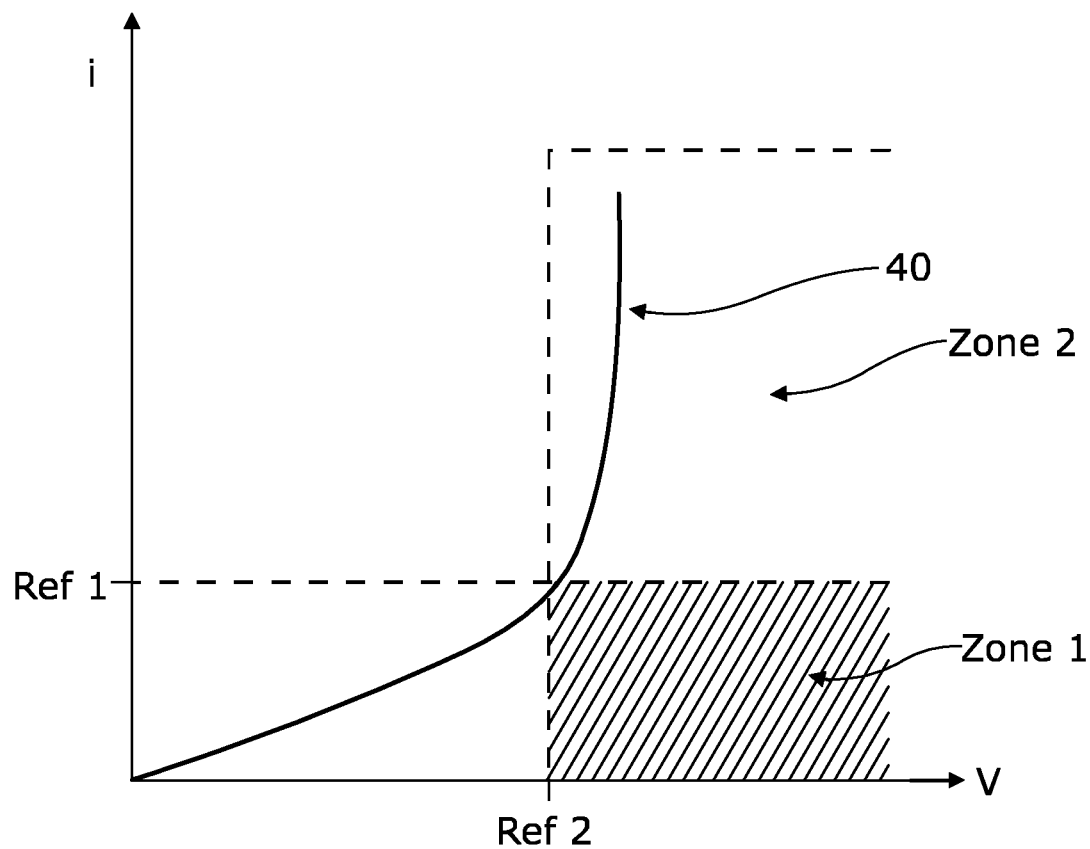
FIG. 4 is a current-potential difference curve showing the nominal electrical profile of a spark plug of the ignition system represented in FIG. 2.

Referring to FIG. 4, the principle of detection of a malfunction of the ignition system 10 implemented by the control device 20 consists in determining an operating point (current-potential) of the spark plug 12 and in comparing it to the nominal electrical profile of the latter (see curve 40). The control device 20 is configured to emit the alert signal S_Alert indicative of a malfunction of the ignition system in the case where the operating point of the spark plug is too far removed from the nominal electrical profile 40.

The control device 20 thus checks the consumption by the spark plug 12 of the energy released by the exciter device 11 and emits an alert indicative of a malfunction of the ignition system 10 if the analysis of electrical signals sampled at the spark plug 12 demonstrates that the level of energy consumed by the spark plug 12 is situated below a certain threshold.

An operating point of the spark plug which is too far removed (zone 1 in FIG. 4) from the nominal electrical profile (zone 2 and curve 40) can reveal a degradation of the spark plug 12, but also of the exciter device 11, of the electrical links 13, 14, and of the environment of the ignition system 10 (problem in the combustion chamber, for example).

The incorporation of such a control device 20 in an ignition system 20 allows the ground maintenance teams to check the operation of the latter more easily.

It will be noted that the voltage sensor 21 or current sensor 22 can each be either arranged between the exciter device 11 and the spark plug 12 or between the spark plug 12 and the structure of the aircraft 6.

Figure 5:
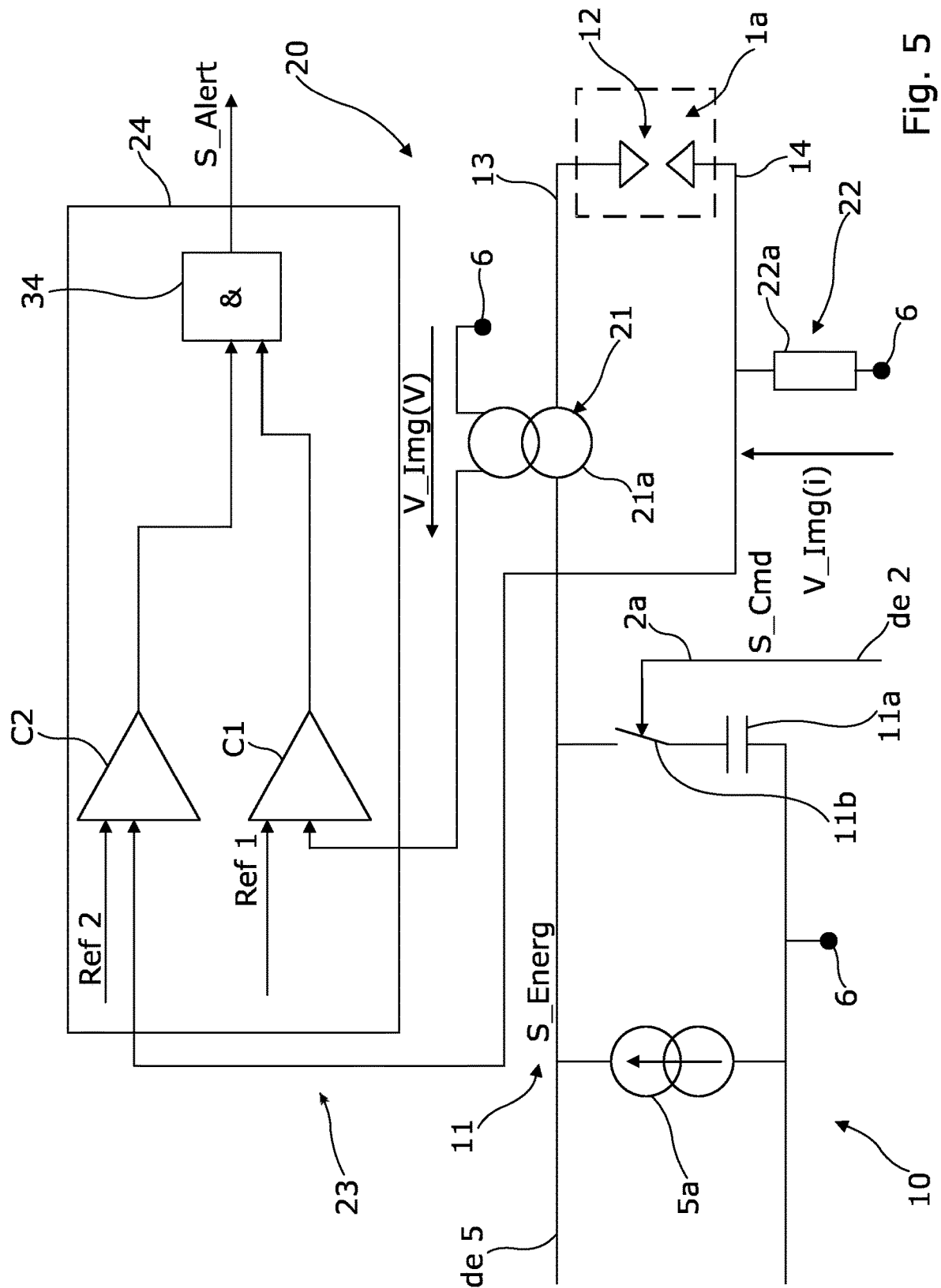
FIG. 5 is a view similar to FIG. 2 representing an electrical circuit diagram of the ignition system according to another embodiment of the invention.

In a second embodiment, and in relation to FIG. 5, the first comparator C1 and the second comparator C2 are produced via a suitable programming of the microcontroller 24. The reference values Ref1 and Ref2 are also programmed in the microcontroller 24. The current sensor 22 and the voltage sensor 21 are directly connected to the microcontroller and the sensors are dimensioned to supply an output voltage that is acceptable for the microcontroller 24 (of the order of 4 to 6 volts, even 3.3 volts for some microcontrollers).

The microcontroller 24 implements, for example, an AND logic gate 34 receiving as input the output signals of the comparators C1, C2. The AND logic gate generates a Boolean signal S_Alert which forms the output signal of the microcontroller. The signal S_Alert is a signal:

indicative of a malfunction (signal S_Alert set at 1) of the ignition system 10 if the value of the amplitude of the signal V_img(i) generated by the current sensor 22 is lower than the second reference value Ref2 when the value of the amplitude of the signal V_img(V) generated by the voltage sensor 21 is higher than the first reference value Ref1.

Preferably, (not represented in the figures) a conditioner circuit and a low-pass filter are arranged between each sensor 21, 22 and the microcontroller 24 in order to convert the image signal generated by the sensor 21, 22 into a form that can be used by the microcontroller 24.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An ignition system of a turbine engine, comprising:
   an ignition spark plug having an excitation terminal and a return terminal,
   a spark plug exciter device connected to the excitation terminal of the ignition spark plug,
   the return terminal being, in use, connected to an equipotential reference-forming structure of the turbine engine,
   the exciter device being, in use, connected to a command line and to an electrical power source supplying an excitation signal to the ignition spark plug on reception of an excitation signal over the command line, a control device comprising a current sensor, a voltage sensor, a first comparator receiving as input a signal generated by the voltage sensor, a second comparator receiving as input a signal generated by the current sensor, and a microcontroller receiving an output of the two comparators, the first comparator being configured to compare a value of an amplitude of the signal generated by the voltage sensor to a first reference value and the second comparator being configured to compare a value of the signal generated by the current sensor to a second reference value, the microcontroller configured to implement an AND logic gate whose output is a signal indicative of a malfunction of the ignition system if the value of an amplitude of the signal generated by the current sensor is lower than the second reference value while the value of the amplitude of the signal generated by the voltage sensor is higher than the first reference value.

2. The ignition system according to claim 1, wherein the current sensor comprises a shunt.

3. The ignition system according to claim 1, wherein the voltage sensor comprises a voltage transformer.

4. The ignition system according to claim 1, wherein the first and the second comparator are analogue, the microcontroller is connected to the output of each of the first comparator and of the second comparator via an analogue/digital converter.

5. The ignition system according to claim 1, wherein the first and the second comparator are digital and produced via a programming of the microcontroller.

6. A method for detecting a malfunction of an ignition system of a turbine engine implemented by a control device, said ignition system comprising an ignition spark plug having an excitation terminal and a return terminal, a spark plug exciter device connected to the excitation terminal of the ignition spark plug, the return terminal being, in use, connected to an equipotential reference-forming structure of the turbine engine, the exciter device being, in use, connected to a command line and to an electrical power source supplying an excitation signal to the ignition spark plug, on reception of an excitation signal over the command line, the control device comprising a current sensor, a voltage sensor, a first comparator connected to the voltage sensor, a second comparator connected to the current sensor, and a microcontroller receiving the output of the two comparators, wherein the method comprises the steps:

measuring a voltage by the voltage sensor, said voltage sensor generating a signal that is an image of said voltage;

measuring a current by the current sensor, said current sensor generating a signal that is an image of said current;

comparing, by the first comparator, an amplitude of the signal generated by the voltage sensor with a first reference value and generating an output signal;

comparing, by the second comparator, an amplitude of a signal generated by the current sensor with a second reference value and generating an output signal;

monitoring, by the microcontroller, a state of the output signal of the first comparator and a state of the output signal of the second comparator;

generating, by the microcontroller, a signal indicative of a malfunction of the ignition system if a value of the amplitude of the signal generated by the current sensor is lower than the second reference value while a value of the amplitude of the signal generated by the voltage sensor is higher than the first reference value.

* * * * *